June 14, 1949.  M. A. ELLIOTT  2,472,814
TESTING DIELECTRIC MATERIALS
Filed July 13, 1945  2 Sheets-Sheet 1
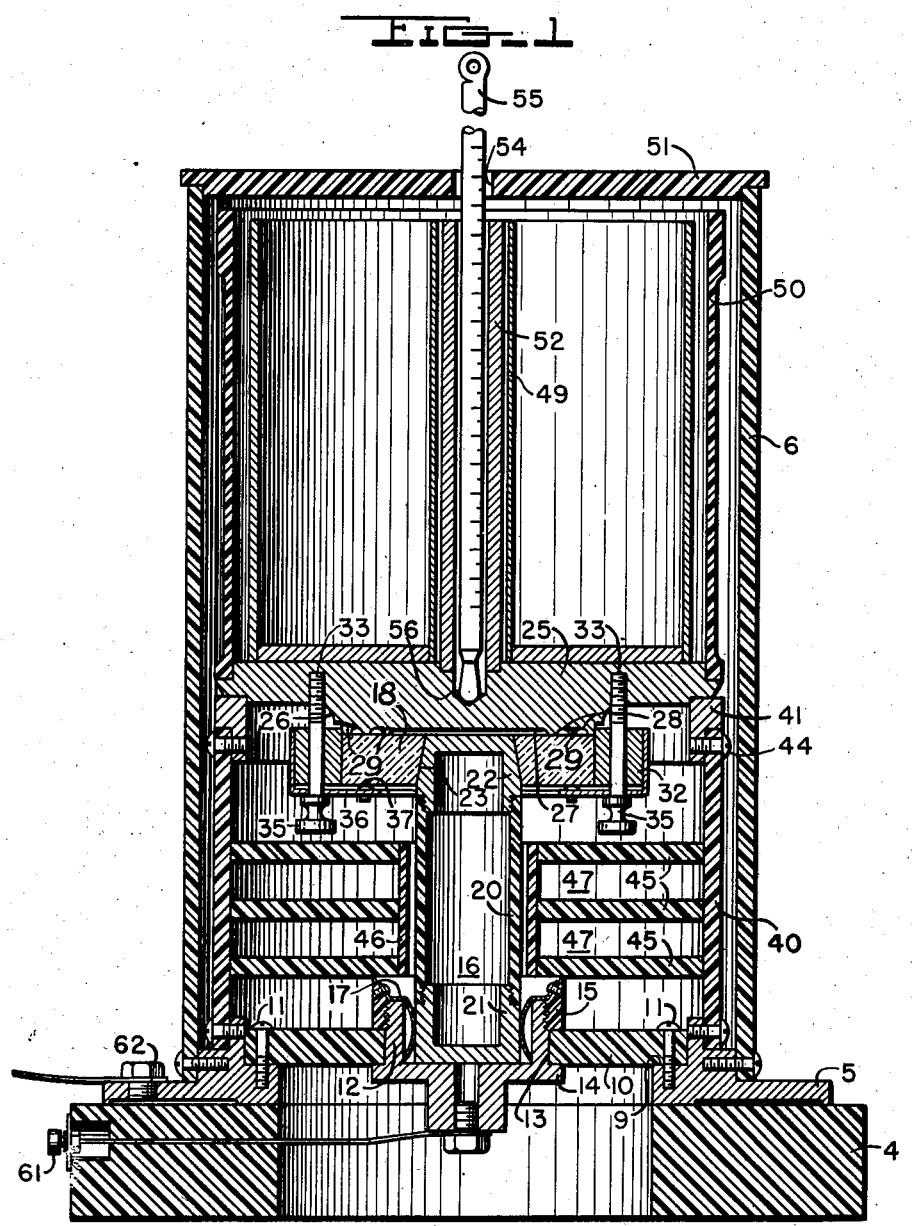
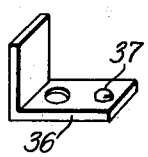
Inventor
MYRON A. ELLIOTT
By Ralph L Chappell
Attorney

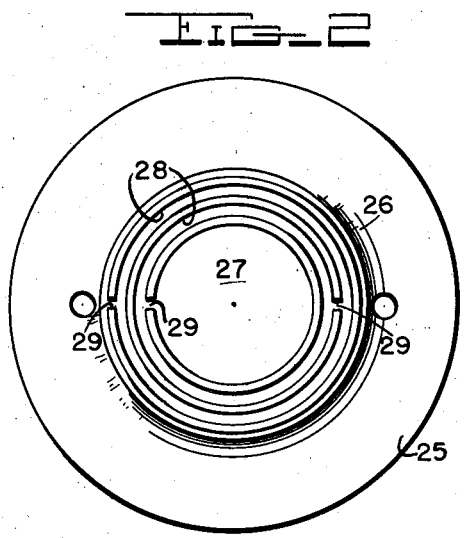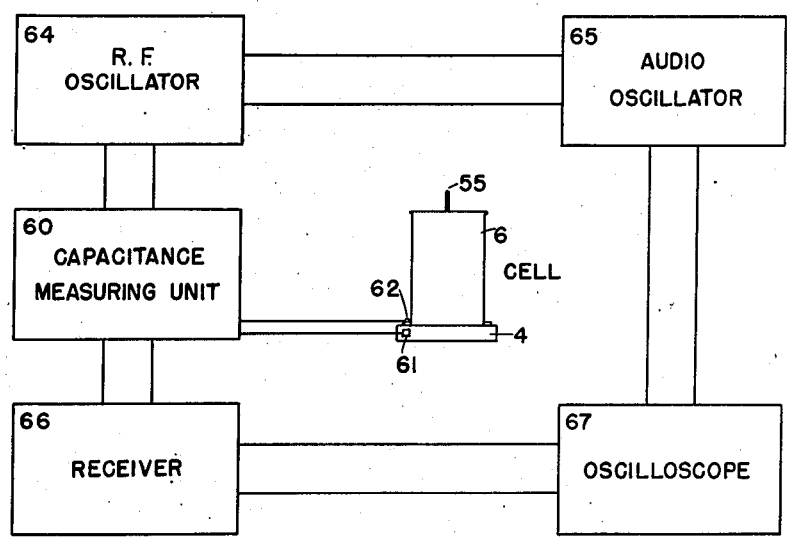

Patented June 14, 1949

2,472,814

UNITED STATES PATENT OFFICE 2,472,814

TESTING DIELECTRIC MATERIALS

Myron A. Elliott, Washington, D. C.

Application July 13, 1945, Serial No. 604,940

8 Claims. (Cl. 175—183)

(Granted under the act of March 3, 1883, as amended April 30, 1928; 370 O. G. 757)

This invention relates to a method of and apparatus for determining the electrical characteristics of dielectric materials and more particularly to a method of and an apparatus for determining the electrical characteristics of liquid dielectric materials.

Where dielectric materials are to be employed in electrical apparatus, it is necessary to ascertain the electrical characteristics of the dielectric materials and particularly among these the dielectric constant and power factor. While, in the case of solid dielectric materials, conventionally utilized electrical tests provide a satisfactory indication of the dielectric constant and power factor, in the case of liquid dielectric materials, however, testing by the methods applicable to the testing of solid dielectric materials may be both inaccurate and impractical.

An object of the present invention is to provide an effective and efficient method of and apparatus for the determination of the electrical characteristics of liquid dielectric materials.

In accordance with one embodiment of this invention, a quantity of the liquid to be tested is placed on an electrode surface, and the electrode assembled in a cell so as to be spaced a predetermined distance from the surface of a second electrode, sandwiching the liquid therebetween. The electrodes are connected to a measuring circuit whereby measurement of the capacitance and conductance of the test sample may be made. The liquid is cooled by cooling the electrodes to a temperature below the peak in the power factor curve. Heat is then applied to the cell to warm the cell at a predetermined rate, measurements being made of the capacitance and conductance at the beginning and at intervals during the temperature rise. During the test an alternating field of constant frequency is applied to the liquid from a suitable frequency source.

Other objects and advantages of the present invention will be apparent from the following detailed description taken in conjunction with the drawings, wherein:

Fig. 1 is a vertical, sectional view of a test cell assembly constructed in accordance with one embodiment of this invention;

Fig. 2 is a detail, elevational view of the base of the upper electrode of Fig. 1;

Fig. 3 is a schematic view illustrative of a testing circuit used in accordance with this invention; and Fig. 4 is a perspective view of one of the spring fingers 36.

The method of this invention is based on the fact that dielectric liquids show a characteristic variation of dielectric constant and loss factor (anomalous dispersion) with change in temperature when the measurements are made while the liquid is subjected to high radio frequencies. Thus, by causing a material to be in a state of anomalous dispersion it is possible to differentiate between materials and to determine the characteristics of different materials under the same conditions.

The common dielectric liquids fall into the general class of liquids which are polar but not ionized. When such liquids are placed in an electrostatic field, the molecules tend to become oriented because of electrical interaction between the electric dipoles in the liquid's molecules and the electric field. When this field is alternating, the molecules tend to follow it and so are turned first in one direction and then in the other. If the alternations of the field are sufficiently rapid, the molecules can no longer follow, but remain in a random state. Under these circumstances the dielectric liquid has a low dielectric constant and low loss factor. At intermediate frequencies, where the molecules can only become partly oriented, the dielectric constant has an intermediate value, while the dielectric loss in the liquid is at a maximum or peak. At low frequencies, the dielectric constant reaches its highest value (static value) while the loss factor drops to a low value. Since the viscosity of the liquid medium in which the molecules are suspended is a function of temperature, it follows that the speed at which the molecules can orient in an alternating field also depends on the temperature. The temperature can, therefore, be used as the variable to obtain the anomalous dispersion curve while frequency is held constant. It will be understood from the foregoing that the frequency employed must be such that the data fall in an anomalous dispersion range of the material under study.

Theoretically, it would be possible to obtain the anomalous dispersion state by lowering the temperature of the liquid sufficiently without application of a high frequency field. However, as a practical matter it would be extremely difficult, if not impossible, to lower the temperature sufficiently. Also some liquids would freeze prior to reaching the anomalous dispersion state. However, by the application of a sufficiently high frequency, in practice on the order of one to thirty megacycles, the temperature level required to produce the anomalous dispersion state may be raised so that, in most cases the anomalous dispersion state will occur in the range of room temperatures. Obviously, the optimum frequency to apply will depend on the material being tested, and, in general, higher frequencies are required with materials having small molecules.

Since as a practical matter, it is simpler experimentally to vary temperature than it is to vary frequency, this invention will be described primarily in conjunction with a test wherein the temperature of the liquid sample is varied, while the frequency applied is maintained substantially constant. It will be understood, however, that it would be equally possible in accordance with this invention to maintain the temperature constant and to vary the frequency, or to vary both.

Referring now to the drawings, wherein is illustrated the apparatus of this invention, and particularly to Fig. 1 thereof, it will be seen that the apparatus is mounted on a base 4, which may be annular in shape and made of a suitable electrical insulating material having low electrical losses, such as polystyrene. On the upper side, as viewed in Fig. 1, of the base 4 is mounted a flat, annular terminal plate 5, which is made of an electrically conductive material, and which serves as a support for a large cylindrically shaped housing 6, mounted on the upper side thereof and suitably secured thereto. The housing 6 is intended primarily to insulate thermally the apparatus so that the apparatus located therein will be unaffected insofar as feasible by room temperature. In practice, it has been found that certain resinous materials, such as phenolic condensation products having low thermal conductivity provide satisfactory thermal insulating properties for the container.

The upper portion of the inner side of the annular plate 5, as viewed in Fig. 1, is recessed slightly to provide a circular ledge 9, on the upper side of which is mounted an annular disc 10 of an electrical insulating material, similar to that used for the base 4, the disc 10 being fixed to the ledge 9 by a number of screws 11 which extend through the outer portion of the disc 10 and threadedly engage the ledge 9. The disc 10 is made relatively thick to provide an adequate support for a tubular socket 12 of electrically conductive material which is located in the central aperture 13 of the disc 10 and the socket is retained therein by an integrally formed flange 14, the upper face of which bears against the lower side of the disc 10 and an internally threaded collar 15 which is mounted on and threadedly engages the upper portion of the socket 12. The collar 15 is adjusted so that its lower face bears against the upper surface of the disc 10 and thus in cooperation with the flange 14, rigidly fixes the tube to the disc.

The upper electrode 22 has attached thereto a cylindrical element 20 of resinous material, such as a phenolic condensation product which has low thermal conductivity. The element 20 is provided at its lower end with a cylindrical cap or plug 21 having substantially the same diameter as the tube 20 and the lower part of the electrode 22. The electrode 22 and cap 21 are electrically connected by a coating of electrically conductive material such as silver or gold, a showing of which is omitted from the drawing because of its extreme thinness compared to the dimensions of adjacent parts. It is to be understood that such coating extends over the entire outer face of the cylinder 20 and on to and over the portion of the adjacent peripheral surfaces of the cap 21 and electrode 22. For effecting electrical connection of the cap 21 with the socket 12 there is provided a plurality of arcuate spring contact members 17 mounted at their upper ends on a collar 15 and extended downwardly into the socket so as to resiliently engage the cap 21 when the latter is inserted in the socket. In order to mount the cap 21 and electrode 22 in the ends of the tube 20, they may be externally threaded adjacent their bases to fit into and engage the lower and upper ends respectively of the tube 20, which may be internally threaded, as shown in Fig. 1. The electrode 22, which may be slightly tapered, extends into and closely engages the sides of a correspondingly tapered aperture 23 formed through the center of the electrode supporting collar or flange 18 of insulating material, and the upper surface of the cap 22, as viewed in Fig. 1, lies in the same plane as the upper surface of the flange 18. The electrode 22 is rigidly secured to the flange 18 as, for example, by a suitable cement.

Since the flange 18 and the electrode 22 will, in accordance with this invention, be located in a region subject to wide temperature variations, it is desirable that they both be made of materials having low coefficients of expansion. At the same time, since the flange 18 is to serve both as a support for the electrode 22 and to insulate the electrode 22 from the adjacent apparatus, it is desirable that the insulating material of which the disc 18 is made be one which has low electrical losses. In practice, it has been found that quartz provides a satisfactory material for the disc 18 and that Invar, since it has a coefficient of expansion substantially identical with that of quartz, which is very low, is satisfactory material for the electrode 22.

When assembled in the apparatus, the upper end of the electrode 22 and the upper side of the associated flange 18 present a smooth, perfectly flat, circular surface to the underside of a second electrode 25 which may be of disc shape, as shown. The electrode 25, the lower side of which is shown in Fig. 2, has integrally formed therewith a wide circular boss 26, located substantially in the central portion of the underside thereof, and extending downwardly therefrom a short distance, to form, in effect, a second flat disc mounted on the electrode 25. The boss has formed therein a centrally located, circular recess or chamber 27 of a suitable depth to provide the necessary spacing between the electrodes 22 and 25. The optimum depth depends on the type of material being tested and may vary considerably accordingly with different materials. The base of the recess 27 is made flat so that when the electrode 22 is assembled against the electrode 25 the upper end surface of the electrode 22 will lie in a plane parallel to the plane of the base of the recess 27. It will be noted that the width of the recess 27 is made substantially greater than the width, or diameter, or the upper surface of the electrode 22 so that only the quartz flange 18 directly contacts the boss 26 on electrode 25, thus preventing electrical connection between the electrode 16 and the electrode 25.

In placing a sample of the liquid to be tested in the recess 27, the electrodes 22 and 25 are removed from the container 6, disassembled, and the electrode 25 inverted so that the recess 27 may be filled. A quantity of the liquid to be tested is placed in the recess 27, a sufficient quantity being used to completely fill the recess 27. Spaced circular grooves 28 are formed adjacent the recess 27, and are concentrically disposed with respect thereto. These grooves receive any excess liquid when the two electrodes are sandwiched together, slots 29 being formed between the recess 27, the grooves 28 and the outside of the boss 26, as shown in Fig. 2, to permit the material to pass therebetween. It is desirable that sufficient liquid be used to completely fill the grooves as well as the recess. By suitably radially spacing the slots 29, the liquid as it flows from the recess to the grooves may be caused to travel in a circuitous path and thus when the liquid contracts due to cooling, the liquid in the grooves serves as a reservoir and will reenter the recess thus keeping the recess filled at all times and preventing air from entering the recess and conversely when the liquid expands it will be able to leave the recess 27 through the slots 29 and grooves 28.

After a suitable quantity of liquid has been placed in the recess 27, the electrode 22 is placed thereover, causing the outer surface of the flange 18 to flatly engage the portions of the boss 26 intermediate the grooves 28 on the underside of the electrode 25, and sealing the recess 27, except for the slots 29. The electrode 22 and flange 18 are then resiliently clamped to the electrode 25 by a ring or collar 32 which is disposed about the periphery of the flange 18 and may be secured to the electrode 25 by a number of threaded members 33 which extend through the ring 32 and threadedly engage the electrode 25. Knurled knobs 35 are provided on the lower ends of the threaded members 33 to facilitate assembly. In order to provide a resilient support for the electrode 22, a number of spring fingers 36 are mounted on the ring 32 and extend radially inwardly from the under side thereof. These fingers may be provided with lugs 37 on the upper sides of their inner ends which are caused to bear against the under side of the flange 18 when the ring 32 is assembled against the electrode 25 and thus to urge the flange 18 and associated electrode 22 upwardly against the electrode 25, thereby ensuring a tight contact at all times.

When the electrode assembly described in the preceding paragraph is positioned in the container 6, the cap 21 extends into the tube 12 and is resiliently engaged by the spring contact members 17. For effecting electrical connection between the electrode 25 and the terminal annulus 5, the tube 40, which is made of a material having low thermal conductivity similar to the material of tube 20, is coated with an electrical conducting material such as gold or silver, a showing of which is omitted from the drawing because of its extreme thinness compared with the dimensions of adjacent parts. It is to be understood that this coating extends over the entire outer and inner surfaces of the member 40 and over adjacent portions of the collar 41 and the terminal annulus 5. The collar 41 is formed of a material having good electrical conductivity, such as brass or copper, and this collar is rigidly fixed to the upper end of the tube 40 by a number of transverse screws 44. In practice it has sometimes been found desirable to coat not only the tube 40 but also the collar 41 and at least the area of the disc 5 adjacent the lower end of the tube 40 with electrically conductive material to provide as low an electrical resistance path as possible.

When the electrodes are assembled together and the cap 21 is properly positioned in the tube 12, the lower peripheral edge of the electrode 25 bears against the upper surface of the collar 41 and the weight of the assembly is largely carried by the collar 41, thus insuring good electrical contact. It is also desirable that the electrode 25 and boss 26 be coated on its under side with electrically conductive material. Because the boss 26 comes into direct contact with the liquid a coating of a material substantially unaffected by possible corrosive action of the liquid is preferable. Gold has been found to be a suitable material. It will be apparent that by providing the intermediate tube 40 of low thermal conductivity material, conduction of heat or cold from the electrode 25 is minimized.

In order to further thermally insulate the region wherein the test sample is located, a plurality of annular discs 45 are located in the area between the lower side of the flat annulus 18 and the upper side of the disc 10 and are supported in spaced relation, one above the other, by a sleeve 46 which extends axially through the apertures formed in the central portions thereof and is suitably fixed to the discs. The internal diameter of the sleeve 46 is made such as to permit the element 20 to pass therethrough preferably without contacting. The peripheries of the discs 45 should extend to the inner wall of the sleeve 40 and may be sealed thereto. Because of the high frequencies at which this apparatus is intended to operate, it will be understood that it is desirable that the discs 45 and sleeve 46 be made of a material having in addition to the characteristic of low thermal conductivity, also low electrical losses. Polystyrene has been found satisfactory. By providing the dead air spaces 47 between the discs 45, rather than using one solid disc of the combined thickness, it has been found that somewhat better thermal insulation is obtained.

In order to subject the test sample to the wide range of temperature variation which it has been found desirable to employ, it has been found satisfactory to first cool the test sample and then to permit the temperature to gradually rise, possibly aided by the application of heat from a heating element. In order to cool the test sample an annular bucket 49, which is preferably made of metal in order to have high heat conductivity, is filled with a coolant material, such as solidified carbon dioxide or ice, and is positioned against the upper surface of the electrode 25, as shown in Fig. 1. Since both the electrode 25 and the bucket 49 are made of metal, because of the rapid heat transfer between contacting metals, it will be understood that the electrode 25 will approximate the temperature of the base of the bucket 49, and consequently the liquid in the recess 27 will be cooled to substantially the same temperature as the electrode 25.

In order to confine and insulate the bucket 49 from the room temperature, insofar as feasible, a large tube 50 of but slightly less diameter than the container 5 and made of a material having low thermal conductivity, such as Bakelite or polystyrene, is mounted about the periphery of the upper side of the electrode 25 and extends upwardly therefrom a suitable distance so that when the electrode assembly is positioned in the container 6, the upper end of the tube 50 will be located just below the upper edge of the cylinder 6, as viewed in Fig. 1. A cover or lid 51 of disc shape and also made of a material having low thermal conductivity may be positioned on the upper surface of the container 5, as shown in Fig. 1, to close the container and thus to further insulate the electrode and bucket from the external temperature.

In order to indicate the temperature of the electrode 25, a supporting tube 52 is mounted on the upper side of the electrode 25 and aligned substantially with the axis thereof and an aperture 54 is formed in the cover plate 51 to permit a suitable thermocouple or a thermometer 55 of rod shape to be lowered therethrough into the tube 52 and to have its lower end bear against the sides of a suitable recess 56 formed in the upper surface of the electrode 25 and connected to the lower end of the tube thus bringing the sensitive portion of the thermometer as close as possible to the recess 27 wherein the test sample is located.

In the operation of this apparatus, after a quantity of the test sample has been placed in the recess 27 formed in the electrode 25 and the electrode 22 has been clamped thereto, as hereinbefore described, the electrode assembly is positioned in the container 6 and electrically connected to a suitable capacitance measuring unit 60, as shown in Fig. 3, one lead therefrom being connected to a terminal 61 mounted on the outer side of the base 4 and suitably connected to the lower end of the tube 12 and thereby connected to the electrode 22. The other lead from the unit 60 is connected to a terminal 62 mounted on the disc 5, adjacent the terminal 61, and is connected through the coated tube 40 to the electrode 25, as hereinbefore described.

While the dielectric properties may be determined by any suitable capacitance measuring apparatus using the method and apparatus of this invention, as described, it has been found in practice that a high degree of accuracy and facility may be obtained by employing a suitable bridge type, capacitance measuring unit, such as the "Twin-T impedance-measuring circuit" described in The Proceedings of the I. R. E., vol. 28, pages 310–318, July 1940. Such unit is indicated in the block diagram of Fig. 3 by the numeral 60. The measurements are carried out by applying a high frequency signal, for example, a signal on the order of 10 megacycles, from a suitable radio frequency oscillator 64, modulated by an audio frequency signal from an audio frequency oscillator 65, to the capacitance measuring unit 60, and through the capacitance measuring unit to the electrodes 16 and 25. A receiver 66 connected to the capacitance measuring unit detects the audio frequency modulation and applies the detected audio signal to one pair of deflecting plates of an oscilloscope 67, the other pair of deflecting plates of which is connected to the audio oscillator. The purpose of using a test signal of audio frequency is to increase the sensitivity of the cathode ray oscilloscope.

In using this testing apparatus with the described cell, the cell is cooled, as hereinbefore described, to the lowest temperature of the range over which the test is to be made and the adjustment of the capacitance bridge measuring unit required to obtain a pattern indicating a balance of the bridge on the oscilloscope is noted. After the audio oscillator has been adjusted to the proper frequency and the bridge balanced, there should appear a crescent shaped pattern on the oscillograph screen. Any variation in the capacitance balance of the bridge will cause the crescent to become fatter, while any variation in the conductance balance will cause the crescent to tip one way or the other depending on which way the conductance balance is off. This ability to distinguish between capacitance and conductance unbalance independently while measuring the momentary electrical properties of a substance that is changing temperature steadily is of great importance as will be readily apparent to those skilled in the art. By removing the bucket 49 of coolant, the temperature of the cell is raised gradually, and at selected points as the temperature is raised, adjustments are made to the capacitance measuring unit to restore the oscilloscope pattern, and the required adjustments noted. Heat may be applied to the test sample as by locating a suitable electrical heater unit adjacent to the electrode 25 to extend the temperature range upward.

By plotting the information obtained as a graph, the characteristic curves for dielectric constant and power factor of the test material may be obtained. By making several tests at different applied frequencies any desired number of such curves may be obtained.

Where herein the various parts of the invention have been referred to as being located in an upper or lower position, it will be understood that this is done solely for the purpose of facilitating description and the references relate only to the relative positions of the parts as shown in the accompanying drawings.

While but one embodiment of this invention has beeen shown and described, it will be understood that many changes and modifications may be made therein without departing from the spirit or scope of the present invention.

The invention described herein may be manufactured and used by or for the Government of the United States of America for governmental purposes without the payment of any royalties thereon or therefor.

What is claimed is:

1. In an apparatus for determining the dielectric characteristics of a liquid, a pair of spaced electrodes having flat parallel opposed surfaces, one of said electrodes having a recess formed in a face thereof opposed to the other electrode for receiving a quantity of liquid, the other of said electrodes being of relatively small volume and provided with a current lead comprising a tube of a material having low thermal conductivity with a coating of electrically conductive material, said other electrode being provided with a supporting collar of electrically insulating material having a flat face flush with the electrode face, means for clamping said electrodes together to cause said collar face to bear against the opposed face of said first electrode, means for cooling said liquid while in said recess, means for applying an alternating field to said electrodes, and electrical testing means operatively connected with said electrodes.

2. In an apparatus for determining dielectric characteristics of a liquid, a base of insulating material, a metallic terminal annulus mounted on said base, a current lead element in the form of a suppporting tube of low thermal conductivity mounted on the terminal annulus and having a thin coating of electrical conducting material in electrical contact with the terminal annulus, a metallic electrode supporting collar mounted on the upper end of the current lead in electrical contact with the said coating, an upper electrode supported on said collar in electrical contact therewith, said upper electrode being of general disk shape having on its under side a central circular flat faced projection, said projection having a central circular recessed portion with a flat rear surface parallel to the said flat faced projection and a plurality of annular grooves communicating with the recessed portion and outside space through connecting grooves, a lower electrode having a flat circular surface parallel to the said flat rear surface of the recessed portion of the upper electrode, a collar of insulating material secured to said lower electrode and having a flat upper face lying in the plane of the flat face of the lower electrode, means resiliently clamping said collar and said upper electrode together face to face concentrically to hold the face of the lower electrode in parallelism with the rear face of the recessed portion of the upper electrode and spaced therefrom a distance equal to the depth of the recessed portion, a centrally perforated supporting disk of insulating material mounted in the central opening of said terminal annulus, a tubular metallic contact socket mounted in the central perforation of the supporting disk, a second current lead element secured at one end to the lower electrode formed of material of low thermal conductivity and coated with electrically conducting material in electrical contact with the lower electrode, a metallic cap carried by said second current lead at the other end in electrical contact with the coating and engageable with said contact socket, a sleeve of electrically insulating material of low thermal conductivity loosely surrounding said second current lead, a plurality of centrally perforated insulation disks extending radially between said sleeve and said first lead element to form a closed thermal insulating cell between the electrode and the remote ends of their respective current leads and the terminal annulus and terminal socket, said upper electrode having a thermometer recess in the top side thereof coaxial with the said circular recess portion in the lower side, a thermometer guide-tube extending upwardly from the thermometer recess, an annular bucket fitting loosely around said tube with the bottom of the bucket resting upon and in thermal contact with the upper surface of the upper electrode, a tubular jacket of low thermal conductivity surrounding the bucket and spaced therefrom, a cylindrical housing element of low thermal conductivity supported on said terminal annulus and enclosing the current leads, collar and jacket and a cover plate for the top of said housing having a central aperture registering with the guide-tube to permit insertion of a thermometer.

3. In an apparatus for determining dielectric characteristics of a liquid, a lower electrode having a flat surface, a collar of insulating material secured to said electrode having a flat face lying in the plane of the flat face of the electrode, an upper electrode of general disk shape having a flat under side face provided with a recessed portion having a flat rear surface parallel to said flat under side face, said upper electrode having in its flat under face a plurality of annular grooves communicating with the recessed portion and outside space, and a metallic supporting collar for said upper electrode in electrical contact with said electrode and out of electrical contact with said lower electrode.

4. In an apparatus for determining dielectric characteristics of a liquid, a lower electrode having a flat surface, a collar of insulating material secured to said electrode having a flat face lying in the plane of the flat face of the electrode, an upper electrode of general disk shape having a flat under side face provided with a recessed portion having a flat rear surface parallel to said flat under side face, said upper electrode having in its flat under face a plurality of annular grooves communicating with the recessed portion and outside space, and a metallic supporting collar for said upper electrode in electrical contact with said electrode and out of electrical contact with said lower electrode, together with a pair of current lead supporting elements one for each electrode each comprising a supporting element of low thermal conductivity coated with electrically conductive material.

5. In an apparatus for determining dielectric characteristics of a liquid, a lower electrode having a flat surface, a collar of insulating material secured to said electrode having a flat face lying in the plane of the flat face of the electrode, an upper electrode of general disk shape having a flat under side face provided with a recessed portion having a flat rear surface parallel to said flat under side face, said upper electrode having in its flat under face a plurality of annular grooves communicating with the recessed portion and outside space, and a metallic supporting collar for said upper electrode in electrical contact with said electrode and out of electrical contact with said lower electrode, together with a removable coolant-containing bucket fitted into thermal contact with the upper face of said upper electrode.

6. In an apparatus for determining dielectric characteristics of a liquid, a lower electrode having a flat surface, a collar of insulating material secured to said electrode having a flat face lying in the plane of the flat face of the electrode, an upper electrode of general disk shape having a flat under side face provided with a recessed portion having a flat rear surface parallel to said flat under side face, said upper electrode having in its flat under face a plurality of annular grooves communicating with the recessed portion and outside space, and a metallic supporting collar for said upper electrode in electrical contact with said electrode and out of electrical contact with said lower electrode, together with a thermometer guide-tube extending upwardly from the upper electrode and a removable annular bucket fitted around the guide-tube spaced radially therefrom and in thermal contact with the upper face of the upper electrode.

7. In an apparatus for determining dielectric characteristics of a liquid, a lower electrode having a flat surface, a collar of insulating material secured to said electrode having a flat face lying in the plane of the flat face of the electrode, an upper electrode of general disk shape having a flat under side face provided with a recessed portion having a flat rear surface parallel to said flat under side face, said upper electrode having in its flat under face a plurality of annular grooves communicating with the recessed portion and outside space, and a metallic supporting collar for said upper electrode in electrical contact with said electrode and out of electrical contact with said lower electrode, together with means resiliently clamping said collar of insulating material and said upper electrode together.

8. In an apparatus for determining dielectric characteristics of a liquid, a lower electrode having a flat surface, a collar of insulating material secured to said electrode having a flat face lying in the plane of the flat face of the electrode, an upper electrode of general disk shape having a flat under side face provided with a recessed portion having a flat rear surface parallel to said flat under side face, said upper electrode having in its flat under face a plurality of annular grooves communicating with the recessed portion and outside space, and a metallic supporting collar for said upper electrode in electrical contact with said electrode and out of electrical contact with said lower electrode, together with a tubular support of low thermal conductivity for the upper electrode surrounding the lower electrode, a support of low conductivity for the lower electrode, a sleeve of electrical insulating material of low thermal conductivity loosely surrounding said lower electrode support, a plurality of centrally perforated insulation disks extending radially between said sleeve and said tubular support to form a closed thermal insulating cell.

MYRON A. ELLIOTT.

REFERENCES CITED

The following references are of record in the file of this patent:

UNITED STATES PATENTS

| Number | Name | Date |
|---|---|---|
| 2,126,363 | White et al. | Aug. 9, 1938 |
| 2,178,225 | Diehl et al. | Oct. 31, 1939 |
| 2,362,428 | Biggs et al. | Nov. 7, 1944 |

FOREIGN PATENTS

| Number | Country | Date |
|---|---|---|
| 163,682 | Great Britain | May 23, 1922 |
| 268,365 | Great Britain | Sept. 29, 1937 |

OTHER REFERENCES

Field, Electrical Engineering Trans., Sept. 1941, vol. 60, pp. 890–895.

Sinclair, Reprint No. A–18 of Engineering Dept. of General Radio Co. from Proc. of the Institute of Radio Engineers, July 1940, pp. 310–318.